United States Patent Office 3,392,130
Patented July 9, 1968

3,392,130
COATING COMPOSITIONS COMPRISING POLY-
VINYL BUTYRAL-HYDROLYZED ALKYL SILI-
CATE REACTION PRODUCT AND ZINC DUST
Robert A. Rucker, San Francisco, and John B. Heymes,
Alameda, Calif., assignors, by mesne assignments, to
Zinc Lock Company, Oakland, Calif., a joint venture
partnership
No Drawing. Continuation-in-part of application Ser. No.
324,219, Nov. 18, 1963, which is a continuation-in-part
of application Ser. No. 244,889, Dec. 17, 1962. This
application Oct. 4, 1965, Ser. No. 492,906
43 Claims. (Cl. 260—23)

ABSTRACT OF THE DISCLOSURE

A zinc-rich paint, a coating vehicle for zinc and other coatings, and a method for making the vehicle and the zinc rich paint. The coating vehicle is made by (a) Condensing at least one organic silicate selected from the group consisting of $C_2$ to $C_8$ alkyl orthosilicates and partial hydrolysis products thereof dissolved in a water-accepting organic solvent with water at the rate of about 1½ to about 2½ molecules of water per molecule of the silicate at a pH of about 0.5 to about 4.5, (b) Aging the product of (a) to assure a sufficient degree of the condensation in (a), and (c) Then reacting the product of (b) with a resin binder of vinyl acetal type having a molecular weight lying between 20,000 and 50,000, a hydroxyl content between 5% and 25%, and an acetal-type content of between 50% and 90%, in a water-accepting organic solvent, the $SiO_2$ content from (b) being one to three times the weight of the resin content.

This vehicle may then be loaded with calcium free zinc dust to the amount of 85% to 98% of the solids content of the finished paint.

---

This application is a continuation-in-part of application Ser. No. 324,219, filed Nov 18, 1963, now abandoned, which was a continuation-in-part of application Ser. No. 244,889, filed Dec. 17, 1962, now abandoned.

This invention relates to coating compositions and particularly to a novel vehicle and to a novel anti-corrosive coating in which very large amounts of highly dispersed metallic powders are incorporated into said vehicle.

The invention provides air-cured coatings with physical characteristics resembling those of inorganic ceramic-type films, while at the same time having the adhesion, toughness, and flexibility of excellent chemically cured organic binders. The coatings range from unpigmented clear coatings to the most heavily loaded coatings, such as zinc-rich paints.

While the invention it not confined to zinc-rich paints, applying as it does to clear films, miscellaneous pigmented coatings and paints containing other metal powders, the zinc-rich paints may be taken as typical of the very difficult conditions where this invention may be used, and reference to them will be helpful in understanding the invention. A "zinc-rich paint" may be defined as a paint composition in which at least 85% of the total nonvolatile film portion is zinc dust. Zinc-rich paints are greatly in demand because they give iron and other corrodible metals excellent protection against corrosion.

One theory (not unchallenged) that has been advanced to explain why zinc-rich paints provide corrosion protection, holds that in the finished coating the zinc dust particles touch each other and that they provide a substantially continuous galvanic connection to the substrate surface. Such electrical continuity is thought to enable the zinc to sacrifice itself to protect the coated steel, iron, or aluminum.

In order for the zinc particles to be able to touch each other and the metal they are protecting, the nonvolatile portion of the vehicle can be present only in very small amount—the vehicle consequently being called "highly starved." Heretofore, when a highly starved vehicle for zinc-rich paint has shrunk during the "drying" process as the volatiles evaporate, the non-volatile remainder has become so extremely thin that it tended to break away from portions of the zinc dust granules holding them only by partial contact. While this left exposed areas of the particles of metal dust touching each other, it also left voids; hence the binding film was necessarily weak, poorly adherent, and permeable, and would adhere satisfactorily only to surfaces that were first sandblasted to white metal in order to provide an etched profile. Even then, the film relied on to hold the zinc onto the substrate was untrustworthy.

Furthermore, a white metal or oxide-free surface was required on the substrate in order to provide an absolute metal-to-metal contact between the substrate metal being coated (e.g., iron) and the zinc. The theory was that with such metal-to-metal contact, moisture reaching the iron surface would set up electrolysis with the zinc and iron acting as electrodes. According to this theory, the resulting hydrogen ions tend to cause the zinc to go into solution in the moisture, while the resultant hydroxyl ions tend to cause the zinc ions to precipitate oxyhydroxy compounds which also draw or trap into the precipitate, complex ions, such as ferrous and silica ions, which are usually present in the moisture, especially in salt water. Consequently, according to this theory, zinc oxyhydroxy silicates form on the surfaces of the zinc particles, and being large in volume (though minute in mass) relative to the zinc dust, they expand into the interstices, and set like a very hard cement, making the film very hard and abrasion resistant. After this reaction occurred, the only time the zinc dust would act as an anode was when the film was ruptured,and then it would act only long enough to heal the breach by forming a little zinc oxyhydroxy silicate at the rupture.

Typical prior-art zinc-rich paints had inorganic vehicles such as sodium silicate or ethyl silicate that furnished an electrolyte, so that the electrolysis reaction between the zinc and the metal substrate started immediately upon coating. Moreover, an acidic curing agent, which was also hygroscopic, was applied shortly after the initial set of the binder; in some cases water was also applied, the surface being washed and scrubbed. When there actually was metal-to-metal contact, the zinc oxyhydroxy cement formed within the etched sandblasted profile, to provide adhesion; if there was a lack of this metal-to metal contact, as where there was an oxide film on the substrate, the result was destructive rather than constructive.

As noted, an etched profile is required for good adhesion, and an ordinary sandblasting operation does not completely clean the iron surface, so that a film of oxide often remains thereon. Such an oxide film prevents metal-to-metal contact, and as a result the zinc oxyhydroxy silicate cement usually does not form there. Since the prior-art vehicles themselves usually have had the poor bonding quality mentioned above, weak points were created which provided inorganic films of poor performance. No oxyhydroxy silicate cement formed, due to the lack of the galvanic action; so the adhesion over iron oxide was poor. Destructive reactions then took place, usually being hastened when the surface was exposed to moisture, or to curing agents of an acid nature.

Even less satisfactory were the zinc-rich paints employing organic vehicles such as chlorinated rubber or polystyrene, because those vehicles did not supply an electrolyte at the instant of application; so it took a very long time for the galvanic action to develop and produce the zinc oxyhydroxy cement. For many days, these coatings were soft and subject to damage.

Another problem common with zinc-rich paints was a condition, often described as "mud cracking," that took place when an excessively thick coating was applied, due to overlapping or poor application processes, resulting in a cracking through of the paint.

The present invention solves these problems and is apparently not as dependent upon the process of converting the zinc dust to an insoluble complex, although possibly with time a zinc oxyhydroxy silica cement does form. In any event, the new coating of this invention appears to have greater water resistance than previous zinc-rich paints and a more effective physical and chemical bonding. As a result, the zinc dust is maintained in a metallic state for apparently a much longer time and is thus more readily available to act anodically than if the interstices were quickly filled with nonconductive zinc oxyhydroxy silicate.

With the present invention, surface preparation is much less critical than it was for inorganic zinc-rich paints heretofore known. For example, the sandblasting operation need not continue until the surface is blasted down to white metal; a clean surface, even though not completely free of adherent oxide, is satisfactory. This progress results from the execellent adhesion obtained by the coating of this invention, even over tightly adherent iron oxide, and its ability to maintain the zinc dust essentially as metal with a minimum formation of the zinc oxyhydroxy silicate in the internal film structure. Like the inorganic zinc-rich paints mentioned above, the coating of this invention is self-healing.

Other problems are solved by this invention. Heretofore, washing and scrubbing were required when inorganic-type zinc paints were to be top coated, and an intermediate primer coat had to be put on over the zinc coat in order for the top coat to adhere. All these requirements are eliminated by use of the present invention.

Another problem that occurred when top coats were applied over present-day inorganic-type zinc-rich paints was that uncured or unreacted alkali in the silicate vehicle tended to effloresce through the top coat when that coat was exposed to damp or marine environment. With the present invention, the vehicle of the zinc-rich paint is neutral and has a very high moisture resistance, so that no such thing happens. Since the finished film of this invention does not develop an alkali under-surface, as do inorganic zinc-rich primers, paints containing drying oils are not subjected to attack or deterioration, and consequently such oil-based overcoats adhere well and weather to the utmost advantage.

An additional problem with organic-type zinc-rich paints has been that on recoating or top-coating they have tended to soften or lift when solvents were applied, whether the solvent was in a lacquer, vinyl, acrylic, or epoxy composition. However, the present invention presents an excellent surface for recoating with all types of top coats, being highly resistant to such solvents, and it eliminates any need for an intermediate primer. Coatings of the present invention do not soften or lift when lacquers, vinyls, acrylics, or epoxies are applied.

Other objects and advantages of the invention will appear from the following description of some preferred embodiments.

The vehicle of this invention comprises a solution of a reaction product of (A) the hydrolyzed and free-water-free and fully reacted reaction product of an alkyl silicate dissolved in an organic solvent and water at a rate of about 1½ to about 2½ molecules of water per molecule of the silicate at a pH of about 0.5 to about 4.5, and (B) a resin binder of the vinyl acetal type having a molecular weight lying between 20,000 and 50,000.

To make portion A, a suitable alkyl silicate is dissolved in a suitable solvent and is hydrolyzed by the addition of a small amount of a dilute or weak acid. A preferred alkyl silicate is ethyl silicate, such as ethyl polysilicate with a 40% silicon dioxide ($SiO_2$) content, and hence known as "ethyl silicate 40." This is a light-colored liquid composed of mixed ethyl polysilicates with an average of five silicon atoms per molecule and a specific gravity of 1.0558 at 20° C. (see Industrial and Engineering Chemistry, vol. 39, No. 11, pp. 1364 et seq. (1947)). Tetraethyl orthosilicate and the condensed ethyl orthosilicate may be used, but it has been found that since their silica content is lower (about 28% $SiO_2$), they do not have the formulating flexibility of the preferred silicate. Higher alkyl silicates may also be used, as will be shown below.

The alkyl silicate is dissolved in a suitable organic solvent, such as acetone, diacetone alcohol, isopropanol, or pentoxone, or various blends. The drying time, flash point, etc. may be adjusted by proper choice of solvents or mixtures thereof.

The idea is to convert the alkyl silicate in solution to a special silicon compound or mixture of compounds that forms clear, hard and adherent silica films at room temperature. This hydrolyzed alkyl silicate may be maintained in solution for a long time, so long as the proper proportions of acid catalyst, water, and suitable solvents are correctly balanced. It appears to be a polysiloxane, and it is notable that the addition of cobalt chloride indicates that there is no free water after completion of the reaction. Weak hydrochloric acid and water may be used to catalyze and do the hydrolysis and other reactions, which appear to include condensation, but other acids may be used as the catalyst: such inorganic acids as sulfuric, ortho-phosphoric, nitric, and sulfamic acids are examples; such organic acids as trichloracetic, formic, and oxalic are examples also. The amounts to be used vary, depending on the individuality of each acid, optimum quantities being readily determinable by a chemist of ordinary skill in this art, after reference to the examples below. The action of the organic acids is slower than that of the inorganic acids; preferably, a film catalyzed with an organic acid is immersed in or sprayed with water after the film has set (e.g., 1–4 hours after application) in order to help the film attain its final hardness.

Portion B, as stated above, employs a resin binder. This may be of the polyvinyl acetal type, including polyvinyl butyral and polyvinyl formal. Such resin should have a molecular weight less than 50,000, preferably 20,000 to 50,000. For use in this invention, the resin is dissolved in a suitable solvent, such as ethyl, secondary butyl, or isopropyl alcohol. Mixtures of these alcohols with diacetone alcohol, methyl amyl alcohol, xylene, or toluene are also suitable; mixtures help to reduce viscosities. Some esters, aromatic hydrocarbons, nitropropanes, ketones and similar compositions may be added to the mixture.

The over-all high resistance to attack provided by this vehicle is due to some reaction between Portions A and B. The alkyl silicate, after the hydrolysis reaction (apparently converted to a polysiloxane) is combined with a solution of the polyvinyl acetal type of resin, and the combination is given a reaction period of three days or more. The film produced by the combination is quite superior to those of either of the individual components, i.e., to those of either Portion A or Portion B. Improvements in adhesion, toughness, mar resistance, solvent resistance, and resistance to mild acids, alkalis and fresh and salt water are obtained.

An example of the improved vehicle is as follows:

EXAMPLE 1
PORTION A

| Ingredient | Parts by weight | Percent |
|---|---|---|
| Ethyl silicate, 40% $SiO_2$ | 188 | 42.3 |
| Diacetone alcohol | 230 | 51.8 |
| Hydrochloric acid (0.9% solution in water) | 5.4 | 1.2 |
| Water | 21 | 4.7 |
| Total parts | 444.4 | 100.0 |

The ethyl (poly)silicate and diacetone alcohol are mixed together, and the hydrochloric acid is separately mixed with the water and added to the mixture of ethyl silicate and diacetone alcohol, with rapid agitation. Normal propyl alcohol may be substituted in equal quantities for the diacetone alcohol. Excess acid may be used; the amount given above is practically minimum, as is the amount of water. The pH should be between 0.5 and 4.5, preferably between 1.5 and 3.0 for greater stability of the product. After thorough mixture, Portion A is stored, preferably for aging at least 72 hours, in order to assure substantial completion of the reaction with water. It may be stored for months without gelling, but is preferably mixed with Portion B within two weeks, in order to arrest the hydrolysis at the most beneficial degree.

PORTION B

| Ingredient | Parts by weight | Percent |
|---|---|---|
| Polyvinyl butyral resin (38,000 molecular weight) | 52 | 15 |
| Isopropanol (100%) | 294 | 85 |
| Total parts | 346 | 100 |

The polyvinyl butyral used in this example is a powdered white solid with 18% to 20% by weight of polyvinyl alcohol and a maximum of 1% by weight of polyvinyl acetate. (This polyvinyl butyral may be Butvar B–90.) A 6% solution in methanol has a viscosity of 13 to 18 centipoises at 20° C. It is dissolved in the isopropanol with rapid agitation.

When Portion B is thoroughly mixed, the properly aged Portion A is added in the amount of 308 parts by weight per the above 346 parts of Portion B (47% A, 53% B). When the whole is thoroughly mixed, it constitutes the finished vehicle. Its Gardner-Holdt viscosity is from N to P, and the vehicle weighs approximately 7.4 pounds per gallon.

This clear vehicle exhibits excellent adherence to surfaces that are normally difficult to coat, such as glass, aluminum, brass, polished stainless steel, and galvanized iron. When dry, it has excellent water resistance and resists very well such solvents as alcohol, commonly used esters, ketones, and toluene. Its initial color is excellent and it does not discolor under either the absence of light or exposure to light. Any calcium-free zinc dust may be used. One good one averages 3.8 to 4.5 microns in diameter, with less than 5% below one micron. Another one has a median radius of 2.9 microns with the following particle distribution:

| Radius in microns— | Percent of sample |
|---|---|
| 0.00–0.25 | 3.4 |
| 0.25–1.00 | 11.8 |
| 1.00–2.00 | 17.8 |
| 2.00–4.00 | 38.0 |
| 4.00–8.00 | 21.3 |
| 8.00–32.00 | 7.7 |
| | 100.0 |

This vehicle may be combined with various pigments to produce a wide range of coatings.

EXAMPLE 2

Leaving Portion A as in Example 1, Portion B is changed to the following:

| Ingredient | Parts by weight | Percent |
|---|---|---|
| Polyvinyl butyral (as in Example 1) | 34 | 15 |
| Isopropanol (100%) | 193 | 85 |
| Total parts | 227 | 100 |

After dissolving this mixture with rapid agitation, it is slowly added to 415 parts of the aged Portion A, with agitation, to produce the finished vehicle (about 65% A and 35% B).

The vehicle of Example 2 is generally similar to that of Example 1, but it is somewhat more resistant to very strong organic solvents, is very slightly less water-resistant and is slightly less flexible.

EXAMPLE 3

Leaving Portion A as in Example 1, Portion B is changed to the following:

| Ingredient | Parts by weight | Percent |
|---|---|---|
| Polyvinyl butyral (as in Example 1) | 26 | 15 |
| Isopropanol (100%) | 147 | 85 |
| Total parts | 173 | 100 |

After mixing this Portion B with 461 parts by weight of the aged Portion A as before (73% A, 27% B) the finished vehicle results.

The vehicle of Example 3 has even better resistance to strong organic solvents than the vehicles of Examples 1 and 2. The film is harder but not as flexible.

The vehicle of Example 1 has about a 1 to 1 ratio between $SiO_2$ and polyvinyl butyral; the vehicle of Example 3 has a 3 to 1 ratio.

Any of these vehicles may have pigment added. To show the ability of the vehicle of this invention to provide a good finished coating, the following examples of zinc-rich paints are given.

EXAMPLE 4

To 61 parts (by weight) of the vehicle of Example 1 add 105 parts of finely divided zinc dust, stirring constantly. The nonvolatile composition of the finished paint is 95.5% zinc and silicon complex and 4.5% of organic acetal (butyral) resin.

This coating has a pot life of approximately 8 hours. Apparently, there is a reaction between the zinc and the silicon complex. When applied, it forms an extremely hard film which adheres tenaciously to smooth metal surfaces. It has excellent corrosion resistance, as evidenced by salt spray tests and salt water immersion tests. It has excellent resistance to aromatic solvents, such as toluene, to alcohols, and to ketones. Lacquers, epoxy coatings, acrylic lacquer, alkyd finishes, oil paints, and anti-fouling paints may be applied directly over the dried coating.

EXAMPLE 5

A zinc-rich paint is made from 62 parts of the vehicle of Example 2 and 105 parts of fine zinc dust. As before, the zinc dust is added under constant agitation until thorough mixture is achieved. The nonvolatile composition of the finished paint is 97.1% metallic zinc-silicon complex and 2.9% organic butyral resin.

Again, the pot life of the finished paint is about 8 hours. This paint also has excellent adhesion, even adhering to glass and smooth metal surfaces. The films are very tough and are somewhat more solvent-resistant than the paint of Example 4 to such solvents as the very troublesome fire-resistant aircraft hydraulic fluids, such as the Skydrol fluids. Resistance to corrosion by salt spray or salt water immersion is as good as the paint of Example 4.

EXAMPLE 6

To 625 parts of the vehicle of Example 3, add 1050 parts of zinc dust, mixing as before to give a paint with a non-volatiles composition of 97.75% metallic zinc-silicon complex and 2.25% organic acetal resin. The resulting paint holds the metallic dust in excellent suspension, requiring only occasional stirring.

The zinc dust in Examples 4 to 6 is maintained at 91% of the total nonvolatiles. It can, however, be varied from about 85% to about 95% of the total, and practical paints can be produced by making the usual adjustments to accommodate such variations, as is known by those skilled in the art. For example, the amount of total solvent may be varied to change the consistency, and gelling agents (such as alcohol-receptive treated bentonite (e.g., Bentone 18C) or propylated aluminum fatty acid compounds, such as the reaction product of 2.5 parts by weight of distilled aluminum isopropylate, 10 parts by weight of coconut oil fatty acids, and 87.5 parts by weight of 2-nitro propane) may be included.

The paints of Examples 4–6 produce greatly superior adhesion, much better than either the organic or inorganic zinc-rich paints heretofore marketed. An etched profile on the substrate is not essential; the total vehicle is even lower than has been ordinarily present in zinc-rich paints heretofore known; even so, the tenacity of the vehicle is so much superior that extraordinary adhesion is obtained even on polished metals. The general resistance of the paints of Examples 4–6 to solvents is much superior to that of the organic type of zinc-rich paints heretofore known, and top-coat finished utilizing strong solvents, such as lacquer, acrylics, vinyls, and epoxy finishes, may be applied directly over the zinc-rich paints of Examples 4–6 without requiring a previous intermediate coat. Heretofore, intermediate coats have been required to avoid lifting of the zinc-rich primer or loosening of the bond, even though the zinc-rich primer may have been applied over a blasted surface.

The film of this invention cures to maximum toughness in about eight hours under average conditions. Once it has been exposed for about fifteen to thirty minutes after application, the film will not be damaged by subsequent exposure to fog or rain. After complete cure, its fresh water and salt water resistance is excellent.

Other alcohol-soluble plasticizers and resins may be introduced into the compositions, and the compounds may have additions enabling some increases in vehicle solids, i.e., enabling the use of more zinc dust per gallon of paint and to obtain a greater flexibility per unit of organic binder. Among the flexibility plasticizers which can be used are alcohol-soluble coumarone-indene resins, and castor oil and blown castor oil, also alcohol-soluble acrylic and vinyl resins, such as Rohm & Haas Acryloid B–72 or C–10LV and National Starch's Resyn 28–1300.

The paint of Example 4 is closer to the organic group than the others, but it contains only about half as much organic content as a typical organic-type zinc-rich paint of the type heretofore known. In actual behavior it is more like the inorganic types, but it has the advantage over the inorganic types of superior flexibility, being more foolproof in cure, whether the film be too thin or too thick, and it has very marked superiority in adhesion. The paint of Example 6 is as resistant to organic solvents as inorganic zinc-rich paints, with the cured film exhibiting resistance to the strongest solvents, such as Skydrol. Unlike inorganic zinc-rich paints, adhesion of the film of the paint of Example 6 is good even over smooth polished steel, though it is not quite as good as the composition of Example 4. It is much better than either the inorganic or organic zinc-rich paints heretofore in use, many of which have had such poor adhesion that they actually fell off smooth steel. It is possible to apply these films over damp surfaces so long as they are not actually wet.

EXAMPLE 7

It is also possible to produce a two package system in which the zinc dust is dispersed in a very fine state by suitable milling to produce a semi-paste material. This semi-paste is of such consistency and characteristics as to have long package stability and to maintain lack of excessive settling and then ease of mixing with the balance of the vehicle just previous to being used.

An example of this modification is as follows:

PORTION A

| Ingredient | Parts by weight | Process |
|---|---|---|
| Ethyl silicate, 40% SiO₂ | 160 | } Mix. |
| Diacetone alcohol | 194 | |
| 0.9% HCl solution | 5.4 | } Mix and add to above with rapid agitation. |
| Water | 21.0 | |
| | 380.4 | |

Allow to age 72 hours before using.

PORTION B

| Ingredient | Parts by weight | Process |
|---|---|---|
| Polyvinyl butyral as in Example 1. | 26 | Dissolve under rapid agitation, then add: |
| Isopropanol | 147 | } Agitate until thoroughly mixed. |
| Tetraethyl orthosilicate | 28 | |
| Diacetone alcohol | 38 | |
| | 239 | |

PORTION C

Ingredients: Parts by weight
  Hydrogenated castor oil _____ 5
  Portion B _____ 239
  Fine zinc dust _____ 1050

Mix and grind these to a 6 grind Hegeman gauge on a roller or other suitable mill and fill into the desired containers. Before use, mix 1 volume of zinc dust semi-paste (Portion C) with 1 volume of Portion A. Allow to set 1 hour before application. The paint may be allowed to age up to 8 hours before applying.

An advantage of this procedure is that it enables the production of a very smooth film, one that is a suitable undercoat for high gloss lacquers or synthetics. It may be top coated after 4 hours air drying time under normal temperature and humidity conditions.

The cured films of the above products (Examples 1–7) are neutral, and top coats may be applied directly to them. The need for an intermediate barrier coat to prevent attack by the alkali present in fresh zinc-rich inorganic paints is eliminated.

When the coating requirements are such that the zinc-rich film will be the only finish, such as the interiors of gasoline and fuel tanks in ship or shore installation where washing and flushing with water or ballast cycles are standard practice, the product of this invention has the advantage of being self-curing while also being water and oil resistant. The film has such improved water resistance and such superior adherence that it performs under constant immersion in water, whereas inorganic zinc-rich paints have not heretofore been recommended for constant water immersion.

EXAMPLE 8

Other pigments may, of course, be used, including other metal powders. For example, the following formulation:

Ingredient: Parts by weight
  Vehicle of Example 1 _____ 612
  Standard aluminum bronze powder _____ 150
  Toluene _____ 72
                                                  ———
                                                  834

This forms a very tough brilliant finish with a rubproof surface, if applied within about eight hours after mixing.

EXAMPLE 9

By substituting for some or all of the zinc dust a quantity of fine zinc dust flake, it becomes possible to get satisfactory or even equivalent results with less zinc. For example, good results are obtained from the following:

| Ingredient: | Parts by weight |
| --- | --- |
| Portion A of Example 1 | 203 |
| Portion B of Example 1 | 353 |
| Isopropyl alcohol | 87 |
| Fine zinc dust flakes (99% passes through a 325 mesh screen) | 600 |
| | 1243 |

Examples of other pigments follow.

EXAMPLE 10

| Ingredient: | Parts by weight |
| --- | --- |
| Vehicle of Example 1 | 692 |
| Rutile (TiO$_2$) | 250 |
| | 942 |

A very tough matte, adherent film is produced.

EXAMPLE 11

| Ingredient: | Parts by weight |
| --- | --- |
| Vehicle of Example 1 | 706 |
| Pure red iron oxide | 200 |
| | 906 |

This is ball milled, whereas the other examples are mixed by simple dispersion.

EXAMPLE 12

| Ingredient: | Parts by weight |
| --- | --- |
| Vehicle of Example 1 | 704 |
| Superfine diatomaceous silica | 100 |
| | 804 |

This also produces a very tough matte, adherent film.

EXAMPLE 13

Zinc dust may be used in conjunction with other pigments, as shown in the following composition:

PORTION A

| Ingredient | Parts by weight | Percent |
| --- | --- | --- |
| Butyral solution of Example 1, Portion B | 232 | 13.8 |
| Tetraethyl orthosilicate | 13 | 0.6 |
| Isopropyl alcohol | 68 | 4.0 |

The above ingredients are dispersed in the included solvents and then are mixed with:

PORTION B

| Ingredient | Parts by weight | Percent |
| --- | --- | --- |
| Zinc dust | 1,000 | 60.0 |
| Unpolished aluminum flake | 20 | 1.2 |

When the zinc and aluminum are dispersed in Portion A, a soft, easily stirred semi-paste is obtained. Then the finished paint is produced by adding:

PORTION C

| Ingredient | Parts by weight | Percent |
| --- | --- | --- |
| Portion A of Example 1 | 342 | 20.4 |
| Total parts | 1,675 | 100.0 |

Any of the hydrolysis products described herein may be employed as Portion C in this example. The aluminum pigment may also be fine unpolished aluminum powder, and the amounts of such additions can be varied at will. The above example uses 5% by volume of the total pigment volume.

Other metals may also be incorporated, including fine cadmium powder and fine nickel powder. Other pigments possessing flake structure may also be introduced to give greater strength; this includes zinc flake, unpolished stainless steel flake, and water-ground mica. They also may be mixed using two or three metallic pigments in combinations, if desired.

EXAMPLE 14

As indicated earlier, an alcohol soluble plasticizer may be simply added to any of the previously given examples. For instance, a solution containing 50% isopropanol and 50% of coumarin indene resin plasticizer (such as Nevillac 10° having a Gardner-Holdt viscosity of $Z_1$ to $Z_2$ or Nevillac TS having a viscosity of U to V) is prepared by simple mixing and may be added in desired proportions to any of the previously given examples, so as to increase flexibility of the finished coating. E.g., by combining 634 parts of Portion B of Example 1 and 21 parts of this plasticizer solution, films of significantly greater flexibility are produced without affecting their general resistance to reagents and to water; the film also has other good characteristics generally.

EXAMPLE 15

In place of polyvinyl butyral resins, polyvinyl formal resins may be used, employing in the hydrolysis phase solvents which are compatible with the formal resin.

A 21,000 molecular weight polyvinyl formal resin (Formvar 7/70, having a hydroxyl content expressed as 5–7% polyvinyl alcohol, an acetate content expressed as 40 to 50% polyvinyl acetate, and a viscosity of 8–10 cps., being made from a polyvinyl acetate having a molar viscosity of 7.0 cps. (the viscosity being determined with 5 g. of resin made to 100 ml. with ethylene chloride at 20° C.), from which 70% of the acetate groups have been replaced with alcohol and formal groups) may be employed with a silicate hydrolysis product made in the following manner:

PORTION A

| Ingredient | Parts by weight | Percent |
| --- | --- | --- |
| thyl polysilicate 40% SiO$_2$ | 188 | 42.5 |
| Dioxane | 152 | 34.5 |
| Isopropanol, 99% | 73 | 17 |
| HCl, 0.9% | 6.5 | 1.5 |
| Water | 20.0 | 4.5 |
| | 439.5 | 100.0 |

The ethyl silicate, dioxane, and isopropanol are mixed together, and the dilute acid and water are added slowly as over a 15-minute period to them with vigorous stirring, which is maintained for 1 hour. This mixture is then stored in acid-proof containers for 72 hours before proceeding to blend it with the following formal solution.

PORTION B

| Ingredient | Parts by weight | Percent |
| --- | --- | --- |
| Polyvinyl formal 21,000 mw | 75.0 | 15.0 |
| Secondary butyl alcohol | 188.0 | 38.5 |
| Xylene | 148.0 | 31.0 |
| Cyclohexanone | 59.0 | 12.5 |
| Dioxane | 15.0 | 3.0 |
| | 485.0 | 100.0 |

This vehicle when mixed and then blended with the aged Portion A possesses greater hardness than that imparted by butyral resins, but is slightly less adherent to smooth metallic surfaces and its water resistance is also slightly inferior to that of the butyral resins.

Higher molecular weight formal resins may be successfully employed such as substituting a 30,000-molecular weight polyvinyl formal (e.g., Formvar 12/85), but then 1,2-nitro propane solvent should be substituted for some of the xylene solvent. The 30,000 molecular weight polyvinyl formal is made from a polyvinyl acetate having a molar-viscosity of 12 and from which 85% of the acetate groups have been replaced with alcohol and formal groups.

It has a hydroxyl content expressed as 5–7% polyvinyl alcohol and an acetate content expressed as 20–27% polyvinyl acetate; its viscosity is 18–22 cps., determined as in the preceding paragraph. Both the 21,000 and 30,000 mw. formals are white free-flowing powders before being dissolved in the solvents. In all cases the partially hydrolyzed ethyl silicate solution as added gradually to the formal solution, and preferably the blend is held 48 hours before using.

EXAMPLE 16

Low to medium molecular weight acetal resins may be employed in place of the butyral or formal resins. For example, one such resin (Alvar 7–70) is made from polyvinyl acetate of 7 cps. molar viscosity (found as before) by replacing 70% of the acetate groups some with alcohol and mostly with acetal groups and has a softening point of 154° C.; a 40% acetone solution has a viscosity of 85 poises. The manufacturer does not give the hydroxyl content but states "A low percentage of free OH groups occurs but these are kept as low as possible." Tests indicate about 6% hydroxyl content calculated as polyvinyl alcohol and an acetal content of about 64%. Another such resin (Alvar 5–80) is made from polyvinyl acetate of 5 cps. molar viscosity by replacing 80% of the acetyl groups some with alcohol and mostly with acetal groups and has a softening point of 151° C.; a 40% acetone solution has a viscosity of 30 poises. The hydroxyl content, calculated as polyvinyl alcohol appears to be about 6% and the acetal content about 74%. Either one of these may be used with an aged Portion A of Example 15 after preparation of Portion B as follows:

PORTION B

| Ingredient | Parts by weight | Percent |
| --- | --- | --- |
| Polyvinyl acetal resin | 75 | 15 |
| Secondary butyl alcohol | 188 | 38.5 |
| Xylene | 148 | 31 |
| Cyclohexanone | 59 | 12.5 |
| Dioxane | 15 | 3. |
| | 485 | 100.0 |

The previously described Portion A of Example 15 may then be added gradually to the above solution, or in its place the following composition may be used as the Portion A; this illustrates somewhat the range of products which can be employed.

PORTION A

| Ingredient | Parts by weight | Percent |
| --- | --- | --- |
| Ethylsilicate 40% SiO₂ | 188 | 42.5 |
| Isopropyl alcohol | 152 | 34.5 |
| Diacetone alcohol | 73 | 17.0 |
| HCl 0.9% | 6.5 | 1.5 |
| Water | 20.0 | 1.5 |
| | 439.5 | 100.0 |

The acetal resins produce vehicles of lower viscosities than do the butyral or formal resins. Their films are lower in water resistance than those of the butyrals but superior to those of the formals. Their hardness and adhesion are like films made from the butyral groups. Both the acetal and formal vehicles carry zinc well, and may be used like the earlier-given examples for the zinc-rich paints.

EXAMPLE 17

As stated earlier, various alkyl silicates may be employed, and the hydrolysis procedures and proportions used for the ethyl polysilicate, 40% SiO₂, vary accordingly. As an example, a satisfactory Portion A may be produced from tetraethyl orthosilicate as follows:

| Ingredient | Parts by weight | Percent |
| --- | --- | --- |
| Tetraethyl orthosilicate | 268 | 62 |
| Isopropanol | 125 | 29 |
| HCl, 0.2% | 40 | 9 |
| | 433 | 100 |

The tetraethyl orthosilicate and alcohol are mixed, and then one-fourth of the dilute hydrochloric acid is added very slowly. The mixture is agitated for 30 minutes. Then five more parts of the acid are added, and the mixture is agitated for five more minutes, another five parts of acid added, and another five minutes of agitation. This alteration of acid addition, five parts at a time, and agitation for five minutes between additions is followed until all the acid has been added. Then the batch is agitated for another hour, during which time the temperature rises to 120°–125° F. This hydrolyzed mixture is then stored for at least seventy-two hours and may then be used as Portion A with any of the butyral or acetal resins in the manners already indicated.

Condensed ethyl silicate may be prepared in identically the same manner, and its hydrolyzed condensed silica yields satisfactory vehicles when blended with the various types of acetal and butyral resins.

The hydrolysis may be obtained by other procedures, such as by adding the alkyl silicates slowly to a mixture of the acid and the solvent, and highly satisfactory coatings are obtained. Zinc may be added as in earlier examples.

EXAMPLE 18

Higher alkyl silicates may also be hydrolyzed and reacted with water so as to produce compositions that satisfactorily combine with acetal and butyral resins to yield vehicles having drying characteristics equal to those of the ethyl silicates, slightly better water resistance, and greater flexibility. An example of such a hydrolized and reacted vehicle (for use as Portion A in preceding examples) is prepared as follows:

| Ingredient | Parts by weight | Percent |
| --- | --- | --- |
| Isopropanol, 99% | 168 | 39.2 |
| HCl, 1% solution | 40 | 9.4 |
| Tetra isopropyl silicate | 220 | 51.4 |
| | 428 | 100.0 |

The dilute acid solution is added to the isopropanol, and the silicate is added very slowly, with vigorous agitation, to the alcohol-acid mix, preferably over a period of thirty to forty-five minutes. Then the mixture is agitated for about three hours. This higher alkyl silicate hydrolizes and reacts more slowly and takes about a week to reach stability. There is then no free water. It may be then combined as Portion A with the acetal and butyral Portion B solutions of previous examples to form coatings of excellent toughness but possessing greater flexibility than the ethyl silicate counterparts. Zinc and other pigments, etc. may be incorporated as in previous examples.

EXAMPLE 19

Tetra butyl silicate may also be hydrolized and reacted with water and used with the acetal butyral resins. An example of such a hydrolysis, giving a Portion A for use with the Portions B of previous examples, is as follows:

| Ingredient | Parts by weight | Percent |
| --- | --- | --- |
| Isopropanol | 188 | 44.6 |
| HCl, 1% solution | 34 | 8.1 |
| Tetra butyl silicate | 200 | 47.3 |
| | 422 | 100.0 |

The silicate is added to the alcohol-acid mix very slowly, preferably over a period of about thirty minutes and under vigorous agitation. After addition is complete, agitation is preferably continued for about three hours. The mixture is then stored for about one week, after which there is no free water and the reaction is apparently completed, and then it may be mixed with the acetal and butyral resins in various proportions such as those indicated in the earlier examples to produce vehicles having greater flexibility than the ethyl ester counterparts while still retaining all the other good characteristics of toughness, adhesion, and water resistance. Zinc and the other pigments may be added, as in preceding examples.

EXAMPLE 20

Another method of introducing flexibility into the resultant film is to hydrolyze and react ethyl polysilicate simultaneously with higher mixed alkyl silicates, such as tetra (2-ethyl butyl) silicate, a monomer with a molecular weight of 432.72 and tetra (2-ethyl hexyl) silicate, a monomer with a molecular weight of 544.92 as shown by the following two examples in which 20% of the silica content is replaced by the higher mixed alkyl. First:

| Ingredient | Parts by weight | Percent |
| --- | --- | --- |
| Ethyl silicate, 40% SiO$_2$ | 136 | 34 |
| Tetra (2-ethyl butyl) silicate | 80 | 20 |
| Isopropanol | 160 | 40 |
| HCl, 0.2% solution | 24 | 6 |
|  | 400 | 100 |

Both silicates are mixed with the isopropanol under rapid agitation, and the HCl is added slowly. The mixture is then agitated for about three hours, the temperature rising to 95° to 100° F. This hydrolyzed and reacted Portion A is aged seventy-two hours, and then it may be blended in desired proportions with the acetal or butyral resin Portion B solutions previously described. The films obtained from such blends with butyral resins are more flexible than is the straight ethyl polysilicate counterpart. This type of composition is advantageously in baking finishes, as compared to the straight ethyl esters, because they do not become as brittle.

EXAMPLE 21

Another product which imparts greater flexibility to the ethyl silicate films is the 2-ethyl hexyl silicate. As stated above, this and the preceding example are based on deriving 80% of the SiO$_2$ from the ester and 20% from the 2-ethyl hexyl silicate.

| Ingredient | Parts by weight | Percent |
| --- | --- | --- |
| Ethyl silicate, 40% SiO$_2$ | 136 | 34 |
| 2-ethyl hexyl silicate | 108 | 27 |
| Isopropanol | 132 | 33 |
| HCl, 0.2% solution | 24 | 6 |
|  | 400 | 100 |

The silicates and alcohol are placed under rapid agitation and the HCl solution added slowly. Agitation is maintained for about three hours. The films resulting from mixing the above Portion A with the desired amount of a Portion B containing butyral or acetal resins are quite flexible and soft under air drying conditions. When baked at 250° F. for thirty minutes, the film possesses excellent toughness while still retaining a high degree of flexibility.

The use of wetting agents in the range of 0.1% to 0.5% based on the SiO$_2$ of the hydrolysis formula has proven beneficial in assuring a smooth, even reaction. Some wetting agents which have been found satisfactory are:

Aerosol OT—Sodium dioctyl sulfo succinate
Aerosol MA—Sodium dihexyl sulfo succinate
Igepal—Nonyl phenoxy polyethylene oxy ethanol
630 to 730—consisting of 63% to 73% combined ethylene oxide and essentially 100% active.

EXAMPLE 22

In this example there are two separate hydrolysis reactions, with the reaction products blended

PORTION A–1

| Ingredients | Parts by weight |
| --- | --- |
| Ethyl silicate (40% SiO$_2$) | 374 |
| N-propyl alcohol | 568 |
| 10% solution wetting agent[1] | 10 |
| 0.25% HCl | 48 |
|  | 1000 |

[1] Aerosol OT-N propyl alcohol.

The first three items are placed in a tank and agitated vigorously. The HCl solution is then fed in at a uniform rate of 1 part per minute. The temperature is maintained between 70° F–80° F., a cooling coil being used to hold the temperature down to 80° F. After the final acid addition, agitation is continued for 1 hour. The pH should be between 2.3 to 2.6.

The material is then stored for 72 hours in a closed tank.

PORTION A–2

| Ingredients: | Parts by weight |
| --- | --- |
| Ethyl silicate (40% SiO$_2$) | 125 |
| N-propyl alcohol | 55 |
| 10% wetting agent soln. (same as in A–1) | 3 |
| 0.50% HCl solution | 8 |
|  | 191 |

The first three items are placed in a tank and agitated vigorously. Then the HCl solution is fed in slowly at the uniform rate of ¼ part per minute or 30 minutes total time. The temperature is maintained between 70°–80° F., employing a cooling coil to hold the temperature down to 80° F. After the acid addition has been completed, agitation is maintained for 1 hour. The pH should be 2.4 to 2.6. This product should be stored in a closely covered tank for 72 hours.

After 72 hours, hydrolysates A1 and A2 are combined and then stirred into a solution of vinyl butyral prepared as follows:

| Ingredients: | Parts by weight |
| --- | --- |
| N-propyl alcohol | 265 |
| Cyclohexanone | 100 |
| Trichlor ethane | 100 |
| Xylene | 100 |
| Polyvinyl butyral | 100 |
|  | 665 |

When thoroughly dispersed and with about 72 hours further aging, the initial reaction between the aldol groups in the butyral resin and the silanol groups in the hydrolysate will be essentially complete. Temperature at this stage should not exceed 80° F.

The composition of the silicon portion appears to be 75% hard drying siloxane and 25% plastic viscous siloxane.

These proportions can be varied from 60% hard to 40% plastic up to 90% hard and 10% plastic, depending on which characteristics are most desired in the finished vehicle. With the harder siloxanes predominating, the butyral resin content is lowered. With the softer siloxanes, the butyral content is increased.

EXAMPLE 23—PORTION A

| Ingredients: | Parts of weight |
|---|---|
| Ethyl silicate (40% SiO$_2$) | 297 |
| N-amyl alcohol | 254 |
| Tetrahydropyran-2 methanol | 109 |
| Methyl Cellosolve | 91 |
| 10% wetting agent (as in Example 22) | 6.5 |
| 0.25% HCl solution | 37.5 |
| | 795.0 |

All the solvents, the wetting agent, and the silicate are added in a stainless tank fitted with an agitator and a suitable cooling coil. The HCl solution is then fed in at the uniform rate of ¾ parts per minute. The temperature is maintained between 70° F.–80° F. After the acid addition is completed, agitation is continued for 2 hours. The tank is then sealed and allowed to stand for 72 hours.

The hydrolysate, having a pH of 2.4 to 2.6, is transferred to a stainless steel vacuum distillation kettle and equipped with a nitrogen sparging diffuser. The kettle should be connected through a distillation head to a receiver for distillate. The kettle, tightly closed, is then evacuated to 28.5–29.0 inch gauge reading. The temperature maintains itself at 70° F.–75° F. Nitrogen gas is then sparged through the hydrolysate at the rate of 5 cubic feet per minute. This drops the vacuum to 26"–27" gauge reading, but the ethyl alcohol released boils off readily. The distillation is continued until solvent ceases to come off. Usually 2–3 hours are required and 175–185 parts of distillate are removed. This distillate is essentially all ethanol. The amount which is removed tallies very close to the theoretical ethanol content in the ethyl silicate.

Then, 580 parts of the residue from the above distillation are mixed with 175 parts of N-amyl alcohol and mixed thoroughly. Then with agitation, the 755 parts of Portion A are added to the cold cut of vinyl butyral prepared as follows:

PORTION B

| Ingredients: | Parts by weight |
|---|---|
| N-amyl alcohol | 107 |
| Cyclohexanone | 40 |
| Trichlorethane | 40 |
| 2-nitro propane | 40 |
| Polyvinyl butyral | 40 |
| | 267 |

When Portion A has been added to the cold cut resin, this produces a vehicle of improved water resistance, greater toughness and flexibility. It is slower in drying than the previously described vehicles. It has a flash point above 100° F. It has all the other highly desirable characteristics such as adhesion, water resistance and ability to bind large amounts of pigment.

Summarizing, the composition comprises (1) the reaction product between water and alkyl silicates under acid conditions, in organic solvents, aged so as to deposit a continuous inorganic film of a silica condensate, combined with (2) an organic vinyl acetal type of resin solution, so as to produce compositions which, when applied to a variety of surfaces, produce very hard water resistant and adherent films. Since the film possesses much greater adhesion than either the silicious condensate or the vinyl acetal resins possess individually, the final film appears to be the result of a coordinated polymer reaction. The organo-inorganic interaction which apparently occurs in the invention produces films upon the evaporation of the solvents that are very strong throughout the entire film thickness with no apparent internal stresses or strains, thereby minimizing "mud cracking."

Summarizing some of the new features of this invention:

(1) In this process, water is completely assimilated in the silicate reaction. No free water can be found.

(2) After hydrolysis, alkyl or ethanol groups are apparently retained in what appears to be a siloxane ring. These "silicones" with the alkyl groups being in a reactive stage, appear to undergo further reaction, the alkyl groups apparently being split off slowly as the hydrolystate ages, or is exposed. Higher molecular weight alcohols apparently tend to enter and replace ethanol radicals in the siloxane ring, producing higher molecular weight silicones.

(3) The use of a partially condensed ethyl silicate or polysilicate as the starting material produces a product more resistant to heat decomposition than does starting with a pure or essentially monomeric silicate ester.

(4) In this process silicic acid does not seem to be formed. Consequently, less reactive polymers are formed which are more stable and susceptible to better control.

(5) The use of dual-phase hydrolysis produces and enables control of the flexibility of the silicon polymer. In addition, hydrolysates produced in this manner have greater stability than those produced where an equivalent degree of hydrolization is achieved in one step.

(6) By using a vacuum distillation, plus simultaneous inert gas stripping at temperatures below 80° F., it is possible to substitute completely with higher alcohol radicals for those ethanol radicals present. The higher alkyls produced in this manner are stable and yield materials having higher flexibility and greater resistance to heat degradation. They are also less dangerous as to inflammability.

(7) When branched chain alcohols are used as the mutual solvents, they enter into the siloxane ring displacing ethanol groups at least partially. These branched chain groups impart greater stability and improved aging characteristics to the reactive silicone and to the final combination with the acetal resins.

When using zinc dust, care should be taken that it is free from such impurities are calcium compounds, which are found in some zinc dusts and are not to be tolerated, for they may result in producing a finished paint that is not satisfactory.

An interesting characteristic of the zinc paint of this invention is that it appears to have more electrical conductance than others heretofore known. Over a quarter-inch gap, ten-mil films, dry, of this invention had resistances varying from 10 to 50 ohms, whereas corresponding measurements on other zinc coatings gave resistances of several hundred ohms.

It will be apparent that other metals besides zinc. and in fact other pigments, dyes, metal powders and flakes may be used for various results, but the invention does solve particular problems in relation to use of zinc paint.

Other solvents for the silicate (Portion A) then those in the examples may be used, including dioxane, pentoxol, methyl cellosolve acetate, mesityl oxide, tetrahydrofurfural alcohol, n-propyl alcohol, diethyl carbitol, methyl ethyl ketone, ethylene carbonate, secondary and tertiary butyl alcohol, ethyl alcohol, 2-mercapto ethanol, methyl cellosolve, isopropyl cellosolve, butyl cellosolve, methyl carbitol, ethyl carbitol, propyl glycol monomethyl ether, propargyl alcohol, and tetrahydropyran-2-methanol. In addition other higher boiling alcohols, such as N butanol, amyl alcohols, (2 methyl-1-butanol) methyl amyl alcohol, (3 methyl-1-butanol) and isoamyl alcohol may be utilized if blended with other solvents which will increase the water acceptance capacity of these alcohols. Solvents or alcohols which can increase this water acceptance are ethanol, isopropyl or normal propyl alcohol, tertiary butyl alcohol, methyl or ethyl cellosolve, (methyl cellosolve acetate) carbitol acetate, triethyl phosphate, propargyl alcohol, tetrahydropyran-2-methanol. An approximate rule is to prepare blends with any of the above high boiling alcohols so that they will accept 30% water. At this ratio they will act successfully as the mutual solvent in the hydrolysis phase. Similarly, there are other good solvents for the polyvinyl acetal-type resin, including cyclohexanone and certain chlorinated solvents that raise the flash point and tend to increase the pot life of the blend, including trichlorethane, chlorothane nu (which is stabilized 111 trichlorethane), perchlorethane, dichlorobenzene, dichloroethyl ether, and methylene chloride.

The preferred water-to-alkyl silicate ranges vary somewhat with the type of silicate. For example, with the tetra ethyl orthosilicate, 1.6 to 2.1 molecules of water per molecule of the silicate is the preferred range, while with ethyl polysilicate (40% silica) a range of about 1.4 to 2.0 is preferred. With tetra isopropyl silicate and tetra butyl silicate, a range of 1.8 to 2.4 is preferred. An overall range of 1½ to 2½ molecules of water per molecule of the silicate is therefore an indication of the practical amounts.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A coating vehicle, comprising the reaction product of
    (A) the hydrolyzed and free-water-free condensation product of at least one organic silicate selected from the group consisting of $C_2$ to $C_8$ alkyl orthosilicates and partial hydrolysis products thereof dissolved in an organic water-accepting solvent and water at the rate of about 1½ to about 2½ molecules (equivalent weights) of water per (equivalent weight) molecule of the silicate at a pH of about 0.5 to about 4.5, and
    (B) a solution in an organic water-accepting solvent of a resin binder of the vinyl acetal type having a molecular weight lying between 20,000 and 50,000, having a hydroxyl content less than about 25% and acetal-type-linkages of at least 50%, the ratio of $SiO_2$ content to resin content being from 1:1 to 3:1.

2. The vehicle of claim 1 wherein the polyvinyl acetal-type resin is polyvinyl butyral.

3. The vehicle of claim 1 wherein the polyvinyl acetal-type resin is polyvinyl acetal.

4. The vehicle of claim 1 wherein the polyvinyl acetal-type resin is polyvinyl formal.

5. The vehicle of claim 1 wherein the silicate is ethyl polysilicate, 40% $SiO_2$ content.

6. The vehicle of claim 5 wherein for each four parts of ethyl polysilicate there is one part of tetra (2-ethyl butyl) silicate.

7. The vehicle of claim 5 wherein for each four parts of ethyl polysilicate there is one part of tetra (2-ethyl hexyl) silicate.

8. The vehicle of claim 1 wherein the silicate is tetrabutyl silicate.

9. The vehicle of claim 1 wherein the silicate is tetra isopropyl silicate.

10. The vehicle of claim 1 wherein the silicate is tetra-ethyl orthosilicate.

11. A paint comprising the vehicle of claim 1 loaded with metallic dust.

12. The paint of claim 11 wherein the metallic dust is zinc in an amount of between 85 and 98% of the finished paint.

13. A coating vehicle, comprising the reaction product of
    (A) the siloxane product resulting from the addition to ethyl poly silicate, 40% $SiO_2$ content, dissolved in a water-accepting organic solvent, of water at a rate of about 1½ to about 2½ molecules of water per molecule of the silicate at a pH of about 1.5 to about 3, aged to complete the reaction, and
    (B) a resin binder of polyvinyl butyral having a molecular weight lying between 20,000 and 50,000, having a hydroxyl content less than 25% and butyral content above 75%, dissolved in a water-accepting organic solvent compatible with that of (A),
    the $SiO_2$ content of (A) being about one to three times the resin content of (B).

14. A coating vehicle, comprising the reaction product of
    (A) the hydrolyzed and free-water-free and aged condensation product of at least one organic silicate selected from the group consisting of $C_2$ to $C_8$ alkyl orthosilicates and partial hydrolysis products thereof dissolved in a first organic water-accepting solvent and water at a rate of about 1½ to about 2½ molecules of water per molecule of the silicate at a pH of about 1.5 to about 3, aged for at least three days, and
    (B) a solution in a second organic water-accepting solvent compatible with said first solvent of a resin binder chosen from the group consisting of polyvinyl formal, polyvinyl acetal, and polyvinyl butyral, having a molecular weight lying between 20,000 and 50,000, having a hydroxyl content less than 25% and a formal, acetal, or butyral content of at least 50%,
    there being from one to three time as much $SiO_2$ content as resin content.

15. The vehicle of claim 14 wherein the component (A) is made in two batches, a first batch having about one molecule of water per molecule of the silicate and a second batch about two molecules of water per molecule of the silicate and subsequently blending them together in the approximate proportions of one part of said first batch to about three parts of said second batch.

16. The vehicle of claim 14 wherein component (A) employs as the organic solvent at the time of blending with component (B) branched chain alcohols.

17. A zinc-rich paint comprising the vehicle of claim 13 loaded with calcium-free zinc dust to the amount of 85 to 98% of the solids content of the finished paint.

18. A zinc-rich paint, comprising (1) the reaction product of
    (A) the siloxane product resulting from the addition to ethyl poly silicate, 40% $SiO_2$ content, dissolved in a water-accepting organic solvent, of water at a rate of about 1½ to about 2½ molecules of water per molecule of the silicate at a pH of about 1.5 to about 3, aged to complete the reaction, and
    (B) a resin binder of polyvinyl butyral having a molecular weight lying between 20,000 and 50,000, having a hydroxyl content between 5% and 25% and butyral content between 75% and 90%, dissolved in a water-accepting organic solvent compatible with that of (A),
        the $SiO_2$ content of (A) being about one to three times the resin content of (B), and
    (2) calcium-free zinc dust in the amount of 85% to 98% of the total weight of the solids content of the paint.

19. A paint vehicle comprising an intimate mixture and reaction product of
    (a) about 45 to 75 parts by weight of (A) a solution of hydrolyzed and condensed ethyl silicate comprising about
        (i) 42% of ethyl polysilicate, 40% $SiO_2$ content
        (ii) 52% of diacetone alcohol,
        (iii) about 1% of a 0.9% water solution of hydrochloric acid, and
        (iv) 5% water, and
    (b) about 55 to 25 parts by weight of (B) a solution of polyvinyl butyral comprising about
        (i) 15% polyvinyl butyral, 38,000 molecular weight, a hydroxyl content of 18% to 20% and a butyral content of about 80%,
        (ii) 85% isopropanol.

20. A zinc-rich paint comprising an intimate mixture and reaction product of
    (a) about 45 to 75 parts by weight of (A) an aged solution of hydrolyzed and condensed ethyl silicate comprising about
  (i) 42% of ethyl polysilicate, 40% SiO₂ content
  (ii) 52% of diacetone alcohol,
  (iii) about 1% of a 0.9% water solution of hydrochloric acid, and
  (iv) 5% water,
(b) about 55 to 25 parts by weight of (B) a solution of polyvinyl butyral comprising about
  (i) 15% polyvinyl butyral, 38,000 molecular weight, a hydroxyl content of 18% to 20% and a butyral content of about 80%,
  (ii) 85% isopropanol, the ingredients (a) and (b) totaling 100 parts by weight, and
(c) about 160 to 180 parts by weight of fine pure zinc dust.

21. A zinc-rich paint, comprising
(a) about one part by volume of a reacted solution made up by weight of
  (i) about 43% of ethyl polysilicate having a 40% SiO₂ content,
  (ii) about 50% of diacetone alcohol,
  (iii) about 1½% of 0.9% HCl solution in water, and
  (iv) about 5½% of water,
(b) about one part by volume of (a) about 19% by weight of a recated solution made up by weight of
  (i) about 11% polyvinyl butyral, having a molecular weight of about 38,000, a hydroxyl content of about 18% to 20%, and a butyral content of about 80%,
  (ii) about 61% isopropanol,
  (iii) about 12% ethyl silicate having a 40% SiO₂ content,
  (iv) about 16% diacetone alcohol,
(c) about ½% by weight of hydrogenated castor oil, and
(d) about 80½% by weight of fine pure zinc dust.

22. A paint vehicle comprising an intimate mixture and reaction product of
(a) about 80 parts by weight of a first solution of hydrolyzed and condensed ethyl silicate comprising about
  (i) 37% of ethyl polysilicate, 40% SiO₂ content
  (ii) 57% of diacetone alcohol,
  (iii) about 5% of a 0.25% water solution of hydrochloric acid, and
  (iv) about 1% of a 10% water solution, of a wetting agent chosen from the group consisting of the non-ionic and anionic surfactants,
(b) about 20 parts by weight of a second solution of hydrolyzed and condensed ethyl silicate, comprising about
  (i) 65% of ethyl polysilicate, 40% SiO₂ content
  (ii) 29% of n-propyl alcohol
  (iii) 4% of dilute hydrochloric acid, 0.50% of water solution equivalent, and
  (iv) 2% of a 10% water solution of a wetting agent chosen from the group consisting of the anionic and non-ionic surfactants, and
(c) about 30 to 100 parts by weight of a solution of polyvinyl butyral comprising about
  (i) 15% polyvinyl butyral, 38,000 molecular weight, with a hydroxyl content of about 18% to 20% and a butyral content of about 80%
  (ii) 40% n-propyl alcohol
  (iii) 15% cyclohexanone
  (iv) 15% xylene
  (v) 15% trichloroethane.

23. A zinc-rich paint comprising an intimate mixture of the vehicle of claim 22 with fine pure zinc dust in an amount of 85% to 98% of the solids content of the total.

24. A coating vehicle comprising
(a) about three parts by volume of a condensed solution made up initially by weight of

| | Percent (about) |
|---|---|
| Ethyl polysilicate having a 40% SiO₂ content | 37 |
| n-Amyl alcohol | 32 |
| Tetrahydropyran-2-methanol | 14 |
| 2-methoxyethanol | 11 |
| Water solution (10%) of wetting agent chosen from the group consisting of the non-ionic and anionic surfactants | 1 |
| Water solution (0.25%) of hydrochloric acid | 5 | from which is distilled of, after condensation, substantially all the reaction-formed ethanol, which is then replaced by about the same weight of n-amyl alcohol, and (b) about one part by volume of a solution made up by weight of

| | |
|---|---|
| Polyvinyl butyral, with a hydroxyl content of about 18% to 20% and a butyral content of about 80% | 15 |
| n-Amyl alcohol | 40 |
| Cyclohexanone | 15 |
| Trichlorethane and 2-nitropropane | 15 |

25. A zinc-rich paint comprising the vehicle of claim 24 plus fine pure zinc dust in the amount of 85% to 98% of the solids content of the total.

26. A method of making a coating vehicle, comprising
(a) condensing at least one organic silicate selected from the group consisting of C₂ to C₈ alkyl orthosilicates and partial hydrolysis products thereof dissolved in a water-accepting organic solvent with water at a rate of about 1½ to about 2½ molecules of water per molecule of the silicate at a pH of about 0.5 to about 4.5,
(b) aging the product of (a) to assure a sufficient degree of the condensation in (a), and
(c) then reacting the product of (b) with a resin binder of vinyl acetal type having a molecular weight lying between 20,000 and 50,000, a hydroxyl content between 5% and 25%, and an acetal-type content of between 50% and 90%, in a water-accepting organic solvent, the SiO₂ content from (b) being one to three times the weight of the resin content.

27. A method of making a zinc-rich coating, comprising adding to the coating vehicle of claim 26, zinc-dust in the amount of 85% to 98% of the solids content of the total.

28. A method of making a coating vehicle, comprising
(a) slowly adding water to at least one organic silicate selected from the group consisting of C₂ to C₈ alkyl orthosilicates and partial hydrolysis products thereof dissolved in a water-accepting organic solvent, there being about 1½ to about 2½ molecules of water per molecule of the silicate at a pH of about 1.5 to about 3,
(b) aging the product of (a) for at least three days, and
(c) then reacting the product of (b) with a resin binder chosen from the group consisting of polyvinyl formal, polyvinyl acetal, and polyvinyl butyral, having a molecular weight lying between 20,000 and 50,000, a hydroxy content between 5% and 25% and an acetal-type content of between 50% and 90% in a water-accepting organic solvent, the SiO₂ content of the total being one to three times the weight of the resin content.

29. A method of making a zinc-rich paint comprising adding to the vehicle of claim 28 calcium-free zinc dust in the amount of 85% to 98% of the total solids content of the paint.

30. The method of claim 28 wherein the polyvinyl acetal-type resin is polyvinyl butyral.

31. The method of claim 28 wherein the polyvinyl acetal-type resin is polyvinyl acetal.

32. The method of claim 28 wherein the polyvinyl acetal-type resin is polyvinyl formal.

33. The method of claim 28 wherein the silicate is ethyl polysilicate, 40% $SiO_2$ content.

34. The method of claim 33 wherein for each four parts of ethyl polysilicate there in one part of tetra (2-ethyl butyl) silicate.

35. The method of claim 33 wherein for each four parts of ethyl polysilicate there is one part of tetra (2-ethyl hexyl) silicate.

36. The method of claim 28 wherein the silicate is tetrabutyl silicate.

37. The method of claim 28 wherein the silicate is tetra isopropyl silicate.

38. The method of claim 28 wherein the silicate is tetraethyl orthosilicate.

39. A method of making a zinc-rich coating, comprising
   (a) making a reacting solution of hydrolyzed ethyl silicate comprising about 42% of ethyl polysilicate, 40% $SiO_2$ content, 52% of diacetone alcohol, about 1% of a 0.9% water solution of hydrochloric acid, and 5% water,
   (b) aging said solution (a) at least three days,
   (c) making a solution of polyvinyl butyral comprising about 15% polyvinyl butyral, 38,000 molecular weight, a hydroxyl content of about 18% to 20%, and a butyral content of about 80%, 85% isopropanol,
   (d) adding about 45 to 75 parts by weight of the aged solution (a) to about 55 to 25 parts by weight of the solution (c) and intimately mixing them,
   (e) adding about 160 to 180 parts by weight of pure zinc dust, and
   (f) applying the resulting product within 8 hours of step (e).

40. A method of making a zinc-rich paint, comprising the steps of
   (a) dissolving about 43 parts by weight of ethyl polysilicate having a 40% $SiO_2$ content in about 50 parts by weight of diacetone alcohol,
   (b) hydrolyzing and condensing (a) by adding to it about 1½ parts by weight of 0.9% HCl solution in water and about 5½ parts by weight of water,
   (c) aging the product (b) for at least three days,
   (d) dissolving about 11 parts by weight of polyvinyl butyral having a molecular weight of about 38,000, hydroxyl content of about 18% to 20%, and a butyral content of about, 80% in about 61 parts by weight of isopropanol,
   (e) adding to (d) about 12 parts by weight of tetraethyl orthosilicate having a 28% $SiO_2$ content and and about 16 parts by weight of diacetone alcohol,
   (f) grinding about 80 parts by weight of fine pure zinc dust into about 19 parts by weight of product (e) and about 1 part by weight of hydrogenated castor oil, and
   (g) adding to the product of (f) the product of (c) in equal volumes and mixing them.

41. A zinc-rich paint, comprising
   (a) about one part of a solution made up by weight of

| | Percent (about) |
   |---|---|
   | Ethyl polysilicate having a 40% $SiO_2$ content | 42 |
   | n-Propyl alcohol | 50 |
   | HCl solution in water (0.9%) | 1½ | enough water to make up 100%, portion (a) being aged between 3 and 15 days, and (b) about two parts by weight of a solution made up by weight of about 12% polyvinyl butyral, having a molecular weight of about 38,000, a hydroxyl content of about 18% to 20%, and a butyral content of about 80%, about 88% isopropanol, portions (a) and (b) being mixed after portion (a) is aged, and
   (c) about three parts by weight of zinc dust flakes, 99% of which passes through a 325-mesh screen.

42. A method of making a paint vehicle, comprising
   (a) dissolving 42 parts by weight of ethyl polysilicate, 40% $SiO_2$ content in 52 parts of diacetone alcohol,
   (b) hydrolyzing and condensing (a) by adding to it about 1 part of a 0.9% water solution of dilute hydrochloric acid, and about 5 parts of water,
   (c) aging said solution (b) at least three days,
   (d) making a solution of polyvinyl butyral comprising about 15% polyvinyl butyral, 38,000 molecular weight, a hydroxyl content of about 18% to 20%, and a butyral content of about 80%, 85% isopropanol,
   (e) adding about 45 to 75 parts by weight of the aged solution (b) to about 55 to 25 parts by weight of the solution (d) and intimately mixing them.

43. A method of making a coating vehicle, comprising
   (a) condensing ethyl polysilicate, 40% $SiO_2$ content, dissolved in a water-accepting organic solvent having a flash point over 100° F. with water at a rate of about 1½ to about 2½ molecules of water per molecule of the silicate at a pH of about 1.5 to about 3, to give a water-free product containing ethyl alcohol formed by the reaction,
   (b) aging the product of (a) to assure completion of the reaction,
   (c) distilling therefrom all the ethyl alcohol formed in the reaction,
   (d) adding an organic water-accepting solvent of flash point over 100° F. to an amount approximating the amount of ethyl alcohol removed in (c) and
   (e) then reacting the product of (b) with a resin binder of the vinyl acetal type having a molecular weight lying between 20,000 and 50,000, a hydroxyl content between 5% and 25%, and an acetal-type content of between 50% and 90%, in an organic water-accepting solvent having a flash point over 100° F., the $SiO_2$ content from (b) being one to three times the weight of the resin content.

References Cited

UNITED STATES PATENTS

| | | | |
|---|---|---|---|
| 2,440,711 | 5/1948 | Bechtold | 117—72 |
| 3,231,535 | 1/1966 | Kemp | 260—29.6 |
| 3,297,616 | 1/1967 | Fisher et al. | 260—29.6 |
| 3,324,055 | 6/1967 | Marks et al. | 260—17 |
| 2,317,891 | 4/1943 | Dennison | 260—33.4 |
| 2,469,320 | 5/1949 | Swan | 260—73 |
| 2,985,546 | 5/1961 | Leavitt | 260—46.5 |
| 3,056,684 | 10/1962 | Lopata et al. | 106—1 |
| 3,180,746 | 4/1965 | Patton et al. | 117—160 |
| 3,202,517 | 8/1965 | Jarboe et al. | 106—1 |
| 3,207,611 | 9/1965 | Ehren | 106—1 |
| 3,234,161 | 2/1966 | Snelgrove et al. | 260—73 |

DONALD E. CZAJA, *Primary Examiner.*

LEON J. BERCOVITZ, *Examiner.*

R. A. WHITE, *Assistant Examiner.*

UNITED STATES PATENT OFFICE
CERTIFICATE OF CORRECTION

Patent No. 3,392,130                                   July 9, 1968

Robert A. Rucker et al.

It is certified that error appears in the above identified patent and that said Letters Patent are hereby corrected as shown below:

Column 1, line 56, "it" should read -- is --. Column 3, line 44, "execellent" should read -- excellent --. Column 7, line 34, "finished" should read -- finishes --. Column 10, line 43, "thyl" should read -- Ethyl --. Column 11, line 7, "as" should read -- is --. Column 12, line 7, "alteration" should read -- alternation --. Column 13, line 35, "advantageously" should read -- advantageous --. Column 16, line 3, "hydrolystate" should read -- hydrolysate --; line 34, "are" should read -- as --; line 44, "zinc." should read -- zinc, --; line 48, "then" should read -- than --. Column 18, line 22, "time" should read -- times --. Column 19, line 27, "recated" should read -- reacted --. Column 20, line 12, "of" should read -- off --. Column 21, line 47, before "hydroxyl" insert -- a --; line 48, "about," should read -- about --; line 52, before "about" cancel "and"; line 60, after "part" insert -- by weight --. Column 22, line 21, after "panol," insert -- and --; after line 63, insert the following:

OTHER REFERENCES

Schildknecht, "Vinyl and Related Polymers", 1952, page 361, Copy in S.L. TP 986 48 S3 C5.

Signed and sealed this 3rd day of March 1970.

(SEAL)
Attest:

EDWARD M. FLETCHER, JR.                       WILLIAM E. SCHUYLER, JR.
Attesting Officer                                Commissioner of Patents